United States Patent [19]

Fuhrhop et al.

[11] Patent Number: 4,765,597
[45] Date of Patent: Aug. 23, 1988

[54] SCARFING NOZZLE

[75] Inventors: Ronald E. Fuhrhop, Belle Mead; Raymond J. Makara, Chatham Township, Morris County both of N.J.

[73] Assignee: L-TEC Company, Florence, S.C.

[21] Appl. No.: 106,899

[22] Filed: Oct. 8, 1987

Related U.S. Application Data

[63] Continuation of Ser. No. 922,037, Oct. 22, 1986, abandoned.

[51] Int. Cl.$^4$ .............................. B23K 7/06; B23K 7/08
[52] U.S. Cl. ............................................. 266/51; 266/52
[58] Field of Search ....................... 266/51, 52; 148/9.5

[56] References Cited

U.S. PATENT DOCUMENTS

| | | | |
|---|---|---|---|
| 2,286,591 | 6/1942 | Triest | 148/9 |
| 2,309,096 | 1/1943 | Bucknam et al. | 148/9 |
| 2,349,902 | 5/1944 | Bucknam | 266/51 |
| 2,622,048 | 12/1952 | Moesinger, Jr. | 148/9.5 |
| 2,664,368 | 12/1953 | Babcock et al. | 148/9.5 |
| 2,838,431 | 6/1958 | Allmang et al. | 148/9.5 |
| 3,231,431 | 1/1966 | Allmang | 148/9.5 |
| 4,013,486 | 3/1977 | Engel | 148/9.5 |
| 4,040,871 | 8/1977 | Engel | 148/9.5 |
| 4,078,950 | 3/1978 | Engel | 148/9.5 |
| 4,120,703 | 10/1978 | Engel | 148/9.5 |

FOREIGN PATENT DOCUMENTS

| | | |
|---|---|---|
| 20947 | 5/1981 | Japan . |
| 22629 | 5/1981 | Japan . |
| 42390 | 10/1981 | Japan . |
| 13473 | 1/1983 | Japan . |
| 20372 | 2/1983 | Japan . |
| 43649 | 9/1983 | Japan . |
| 40544 | 10/1984 | Japan . |
| 183968 | 10/1984 | Japan . |
| 105592 | 12/1985 | Japan . |

Primary Examiner—Wayland Stallard
Attorney, Agent, or Firm—Bell, Seltzer, Park and Gibson

[57] ABSTRACT

Apparatus for scarfing defects in a metal workpiece having an oxygen discharge nozzle terminating in a nozzle discharge orifice adapted to discharge a sheet-like stream of cutting oxygen of uniform intensity across the surface of a metal workpiece and means for admixing a gas with the oxygen to be discharged through the discharge orifice wherein at least one edge of the sheet-like stream of oxygen is of reduced privity insufficient to scarf a workpiece, while the remainder of the sheet-like stream is sufficient to scarf defects from a workpiece surface.

4 Claims, 6 Drawing Sheets

SCARFING NOZZLE

This is a continuation of co-pending application Ser. No. 922,037 filed on Oct. 22, 1986, now abandoned.

FIELD OF THE INVENTION

The present invention relates to the thermochemical desurfacing of metal workpieces which contain defects, commonly called scarfing, and more particularly, to a scarfing nozzle which is suited for desurfacing an entire workpiece for defect removal or for selective fin-free scarfing of various size sections to be scarfed.

BACKGROUND OF THE INVENTION

As is well known, during the production of steel it is customary to condition the surfaces thereof at an intermediate stage of the steel making process. The purpose of such conditioning is to eliminate surface defects such as cracks, seams and slag inclusions that would produce defects in the finished products if not removed. It has been found economical to eliminate such defects from a workpiece by thermochemically removing the surface layer of one or more surfaces or portions thereof, by the use of a suitable machine, preferably interposed in the mill conveyor line between roll stands. In this way, the steel workpiece may be conditioned while hot and without interrupting continuous production of steel.

In many instances, the steel mill does not produce merely one size workpiece and often, many different sizes are produced in the same mill; it is common practice to change sizes between alternate workpieces in some mills. It has been the practice to remove such surface defects from workpieces such as billets, ingots, blooms, slabs and the like, by means of a scarfing machine having a single nozzle adapted to discharge a jet of oxygen along and acutely to an entire ferrous metal surface for the thermochemical reaction with surface metal, or by directing several oxygen streams from a plurality of nozzles disposed in a row or bank.

More recently, efforts have been made to employ an energy-saving, yield-increasing expedient known as hot charging, or direct rolling, whereby the semifinished steel product emerging from the continuous casting or slabbing process is immediately fed, while hot, to a working station. If seams, slag and/or other flaws in the steel surface were left unremoved in this stage, objectionable defects of a permanent nature would be developed in the finished product.

As indicated, these flaws usually have been removed by scarfing of the entire surface, but the practice involves the loss of significant amounts of metal and it is being replaced by localized scarfing for selective removal of the flaws (commonly referred to as selective, spot or band scarfing). Many different techniques and apparatus have been developed for selective or spot scarfing of metal surfaces to overcome the shortcomings indicated above. For example, in selective scarfing, generally several abutting individual scarfing nozzles are disposed transversely across the path of movement of the metal workpiece and are selectively operated so as to scarf only those areas containing surface defects, rather than the entire work surface.

Conventional scarfing processes have employed a wide variety of nozzles. The most common shapes of the oxygen discharge orifice have been either round (such as shown in U.S. Pat. No. 2,309,096 to Buckman et al.), slotted with round ends (such as shown in U.S. Pat. No. 2,664,368 to Babcock et al.), or a continuous slot (described in U.S. Pat. No. 2,622,048 to Moesinger and U.S. Pat. Nos. 2,838,431 and 3,231,431 to Allmang et al.). With such scarfing techniques, along the margins or boundaries of the treated area, slag and waste material, including molten metal, tend to flow from the undercut space and accumulate in a thin layer or film, a portion of which adheres to the metal surface, generally along the cut edges, and is termed a "fin". The slag is not all iron oxide but contains considerable metallic iron which has been displaced in the molten state due to the heat of reaction. Such "fin" formations are highly objectionable because they form surface defects when for example, rolled into the work by subsequent rolling operation; and it is most desirable that they be reduced to a minimum or, preferably, eliminated to prevent blemishes in the finished products.

In an effort to minimize the problem of "fin" formation, generally, it has been a practice to use the above types of nozzles in conjunction with jets of air, water or the like which are directed at the incipiently forming "fins" so as to push the "fin" forming molten metal away from the unscarfed work surface before it can solidify.

More recently, spot scarfing nozzles capable of individually scarfing randomly located defects in a metal body without forming "fins" along the boundaries of the scarfing cut have been disclosed, for example, in U.S. Pat. Nos. 4,013,486 and 4,040,871 to Engel which involve changing the geometry of the scarfing nozzle slot in a manner that reduces the amount of oxygen flow from the edges of the nozzle. Individual scarfing nozzles such as disclosed in U.S. Pat. No. 4,040,871, however, produce cuts which are narrower than the width of the nozzle discharge orifice. Thus, if two of these nozzles are aligned side-by-side to make two adjacent cuts in a single pass, an unscarfed or reduced scarfed area will remain between the cuts. Nozzles such as disclosed in U.S. Pat. No. 4,013,486 substantially eliminate the unscarfed or reduced scarfed area between the cuts of nozzles aligned side-by-side, but achieve that end only by changing the geometry of the nozzle slot, which reduces the flexibility thereof for use under varying scarfing conditions and for being automated.

One type of spot scarfing machine is commercially used to desurface the entire workpiece or, alternatively, to selectively scarf randomly located defects. It is composed of a plurality or bank of two or more adjacent scarfing nozzles, each of which is butted, side-by-side, with other like scarfing nozzles. Such machines generally include a starting method so that the scarfing reaction can be started at any point along the length of the steel workpiece. In such machines, it would be highly desirable to totally eliminate the problem of having unscarfed areas, or reduced scarfed areas, between adjacent cuts when a defect as wide or wider than the width of the scarfing nozzle is to be scarfed, as well as being capable of making a "fin" free selective scarfing cut with scarfing units which could be operated automatically and, preferably, could be remotely controlled.

It is known that among the many variables and conditions affecting and necessary to sustain the scarfing reaction (i.e., thermochemical, exothermic reaction for metal surface removal), the purity of the oxygen in the cutting fluid must be of a specific level. Thus, the oxygen purity of a scarfing nozzle oxygen stream provides a means for controlling the scarfing reaction to reduce the metal removal to zero. Heretofore, various ways have been suggested which generally apply this factor as one of the elements in producing a "fin" free scarfing pass including the use of a variety of auxiliary scarfing unit apparatus and nozzle configurations intended to dispense oxygen of reduced purity or non-oxygen containing gases at or near the edges of a scarfing nozzle.

Other suggested means for acquiring "fin" free scarfing typically involve the use of external jets, nozzles and the like to dispense a fluid, such as air or water, which is directed in such a way as to blow away molten steel at the pass edges. Thus, the force of fluid velocity and momentum are the principles used to eliminate the "fin."

Still other means of producing a "fin" free scarfing pass involve the principle of reducing oxygen flow. In a typical application such as disclosed in U.S. Pat. No. 4,013,486, the geometry of the scarfing nozzle slot is changed in a manner that reduces the normal nozzle opening, thus reducing the amount of oxygen flow. Other variations include a nozzle of normal geometry, but with reduced oxygen pressure. In either case, the flow of oxygen is reduced to a point where it is insufficient to sustain the scarfing reaction, resulting in scarfing terminating at the pass boundary with no "fin" being formed.

While many of the known processes and apparatus have been used commercially, they have been found to exhibit certain disadvantages such as: the complexity of the specially configured nozzles or jets; lack of flexibility in dealing with variables in steel compositions, scarfing speed, steel temperature, oxygen flow and pressure and the like; limitations in automatability of the process or the apparatus; and the like, and it would be highly desirable if a more flexible and, preferably, a readily automatable or remotely selectable system could be developed, particularly if such improvements resulted in less complex and costly apparatus and systems.

SUMMARY OF THE INVENTION

Accordingly, it is an object of this invention to provide a scarfing nozzle optionally capable of making a "fin" free cut substantially as wide as the nozzle itself or of selectively scarfing defects in the surface of a metal which are of random size and location without forming "fins."

It is a further object of this invention to provide a selective scarfing nozzle capable of making a "fin" free cut of random size and location which is adaptable for automatic control of the scarfing.

It is another object of this invention to provide a uniformly contoured selective scarfing nozzle capable of making a "fin" free cut substantially as wide as the nozzle itself.

It is still a further object of this invention to provide a scarfing nozzle capable of making a "fin" free cut wherein varying the purity of the oxygen stream issuing from the opposite edges of the slot of the nozzle can be effected to readily produce "fin" free scarfing cuts under varying scarfing conditions.

It is yet another object of this invention to provide a scarfing nozzle capable of making a "fin" free cut wherein a gas is admixed with the oxygen at the edge or edges thereof to effect a reduction of the purity of the oxygen at such edge or edges.

A still further object of this invention is to provide a selective scarfing nozzle capable of being operated side-by-side with other like nozzles in a bank or gang to produce scarfing cuts wider than the width of one of said nozzles without the formation of unacceptable ridges or grooves there between.

Still another object of this invention is to provide a method for scarfing defects from the surface of a metal body to produce a scarfing cut which, preferably, is "fin" free, by directing a sheet-like stream of oxygen from a scarfing nozzle whereby the purity of oxygen at the edges of said oxygen stream is selectively controlled to effect a scarfing cut of a desired width.

Other objects of the present invention will become apparent from the following detailed description taken in connection with the accompanying drawings.

In accordance with the present invention it has now been found that the objects of the invention can be generally attained by providing an oxygen discharge nozzle for scarfing defects in a metal body, preferably while avoiding the formation of "fins" along the boundaries of the scarfing cut, said nozzle being suited to produce scarfing cuts of a size less than the width of said nozzle up to about as wide as the width of said nozzle comprising:

an oxygen gas passage terminating in a nozzle discharge orifice, adapted to discharge a sheet-like stream of cutting oxygen of uniform intensity across the surface of a metal body to be scarfed; and means for admixing a gas with said oxygen to be discharged through said nozzle discharge orifice wherein the oxygen discharged from at least one edge of said stream of oxygen is of reduced purity insufficient to scarf a workpiece while the remainder of the sheet-like stream of oxygen discharged is sufficient to scarf defects from the surface of a workpiece.

It has been found that by diluting the purity of the oxygen below that required in the scarfing process (thermochemical removal of metal) along at least one of the edge areas of the sheet-like stream discharged through the nozzle discharge orifice, the scarfing process is terminated, or not started, along the boundary area of the scarfing cut. A "fin" free scarfing cut can thus be made. This result, surprisingly and unexpectedly, can be achieved without, in any way, inhibiting the remainder of the sheet-like stream of oxygen from removing surface defects by the scarfing process. Moreover, a relatively similar velocity of gas can be maintained at or near the transitional point in the oxygen stream which substantially contributes to a "fin" free scarfing cut being made. Control of the scarfing process can be effected by means that is readily incorporated within a scarfing nozzle device and eliminates the need for externally mounted or auxiliary devices; the nozzle lends itself to gang-mounting of scarfing nozzles; the quantity of supplementary fluids is substantially less than required in prior art methods; the nozzle is uniformly contoured, eliminating the need for built-in obstructions or changing configurations; flexible, versatile and automatable and/or remote operation controllability can be readily achieved.

Another aspect of the present invention concerns a process for scarfing defects from the surface of a metal body which comprises directing a sheet-like stream of oxygen from a scarfing nozzle discharge slot acutely against a molten metal to produce a thermochemical reaction thereon and a scarfing cut of desired width; and admixing a gas with the oxygen to be discharged through said nozzle discharge slot in an amount sufficient to reduce the purity of the oxygen along at least one edge of the stream of oxygen discharged from said nozzle discharge slot such that a thermochemical reaction is not maintained by the oxygen at the edge or edges of the stream of oxygen, and the oxygen of reduced purity is of sufficient intensity to produce a "fin" free region at the boundaries of the scarfing cut while the remainder of the stream of oxygen is sufficient to scarf defects from the surface of a workpiece, whereby a "fin" free scarfing cut of desired width is achieved.

The apparatus and method of the present invention will become apparent from the following description thereof when considered together with the accompanying drawings which is set forth as being exemplary of the present invention and is not intended in any way, to be limitative thereof.

DETAILED DESCRIPTION OF THE INVENTION

Figure 1:
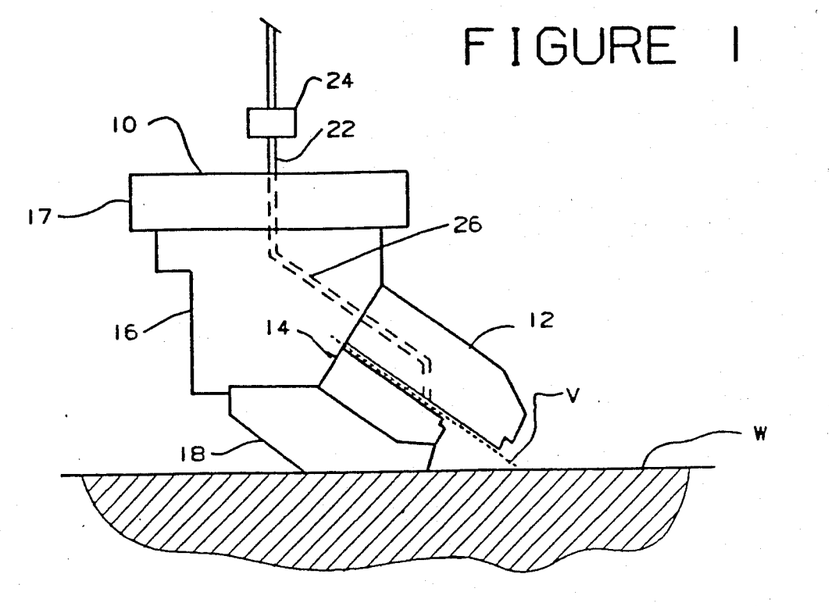
FIG. 1 is a side elevation view of a single scarfing unit incorporating a scarfing nozzle in accordance with the invention.
Figure 2:
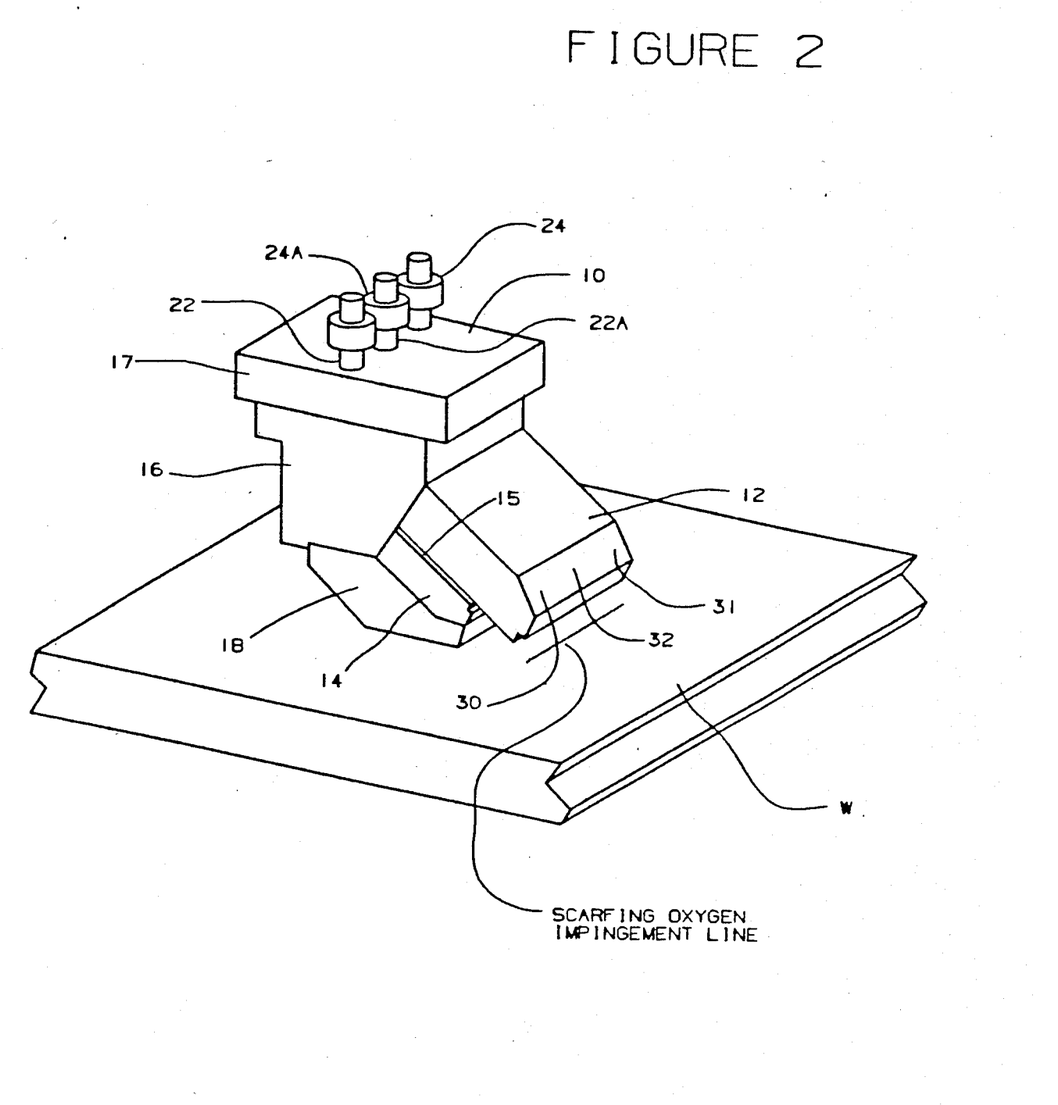
FIG. 2 is a perspective view of a single scarfing unit shown in FIG. 1.
Figure 3:
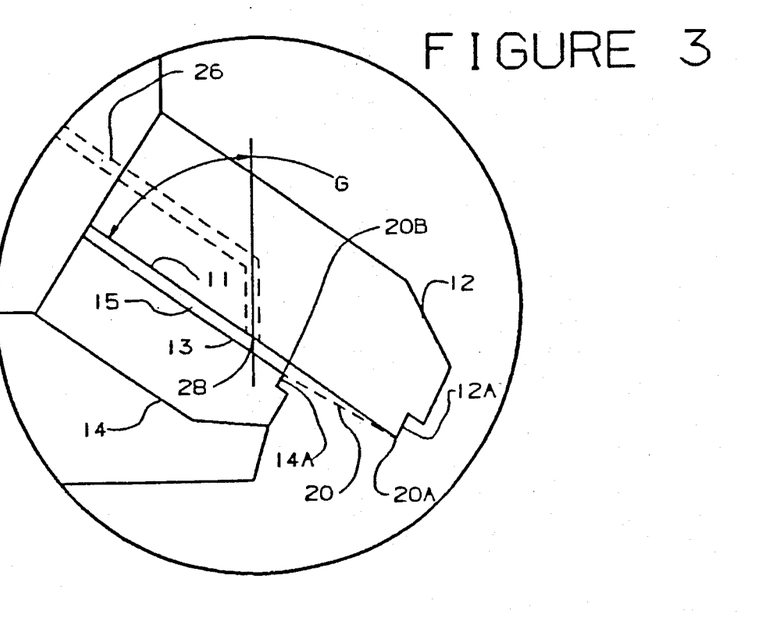
FIG. 3 is a fragmentary side elevation view of a scarfing nozzle of the scarfing unit of FIG. 1.

Referring to the drawings, wherein like reference numerals denote like parts, there is shown in FIGS. 1, 2 and 3 a scarfing unit shown generally as 10, which incorporates the scarfing nozzle of the invention. The scarfing unit 10 is comprised of an upper preheat block 12 with a row of conventional upper preheat ports 12A, a lower preheat block 14 with a row of conventional lower preheat ports 14A, a conventional head 16, a conventional manifold type device 17 and a conventional shoe 18. The lower surface 11 of upper preheat block 12 and the upper surface 13 of lower preheat block 14 define a continuous slot-like scarfing nozzle 15 having a discharge orifice 20 from which a sheet-like stream "V" of scarfing oxygen is discharged. Oxygen or oxygen and fuel gas are supplied to manifold 17 through pipes (not shown), and then to the scarfing nozzle 15 and to the preheat ports 12A and 14A by means well known in the art.

The term discharge orifice as used throughout the present specification and in the claims appended hereto, is intended to mean the rectangularly shaped plane whose width is defined by the scarfing unit boundary "U" (FIG. 4) and height is defined by the edge 20A of the upper preheat block 12 and the edge 20B of the lower preheat block 14. The sides of the nozzle 15 and orifice 20 can be closed or, preferably, are open as shown in FIGS. 1 to 3.

The conventional scarfing unit shoe 18 rides on the surface of the workpiece "W" during scarfing to keep the scarfing nozzle positioned a constant distance from the work surface. The scarfing reaction is carried out by impinging on a molten puddle a sheet-like stream of scarfing oxygen "V" discharged from the nozzle discharge orifice 20 at an acute angle to the work surface, while relative motion is caused to take place between the workpiece "W", such as a steel slab, and the scarfing unit 10.

In accordance with the invention, the manifold type device 17 is provided with gas supply pipes 22 and 22A having control valves 24 and 24A. Such supply pipes 22 and 22A communicate with passages 26 and 26A, respectively, through manifold 17, head 16 and block 12, and with outlet ports 28 and 28A in block 12, for conducting a diluting gas into admixture with oxygen passing through the continuous slot scarfing nozzle 15, generally at a preselected position along one edge or at the opposite edges of a stream of oxygen before discharge thereof from the discharge orifice 20.

When a stream of oxygen less than the width of the nozzle slot 15 (nozzle boundary "U"-FIG. 4) is to be used in the scarfing reaction, the gas supply pipe 22A intermediate the supply pipes 22, in communication with passage 26A and outlet port 28A would be used to supply a diluting gas for admixture with the oxygen along the edge of the stream of oxygen of reduced width in accordance with the invention.

Figure 4:
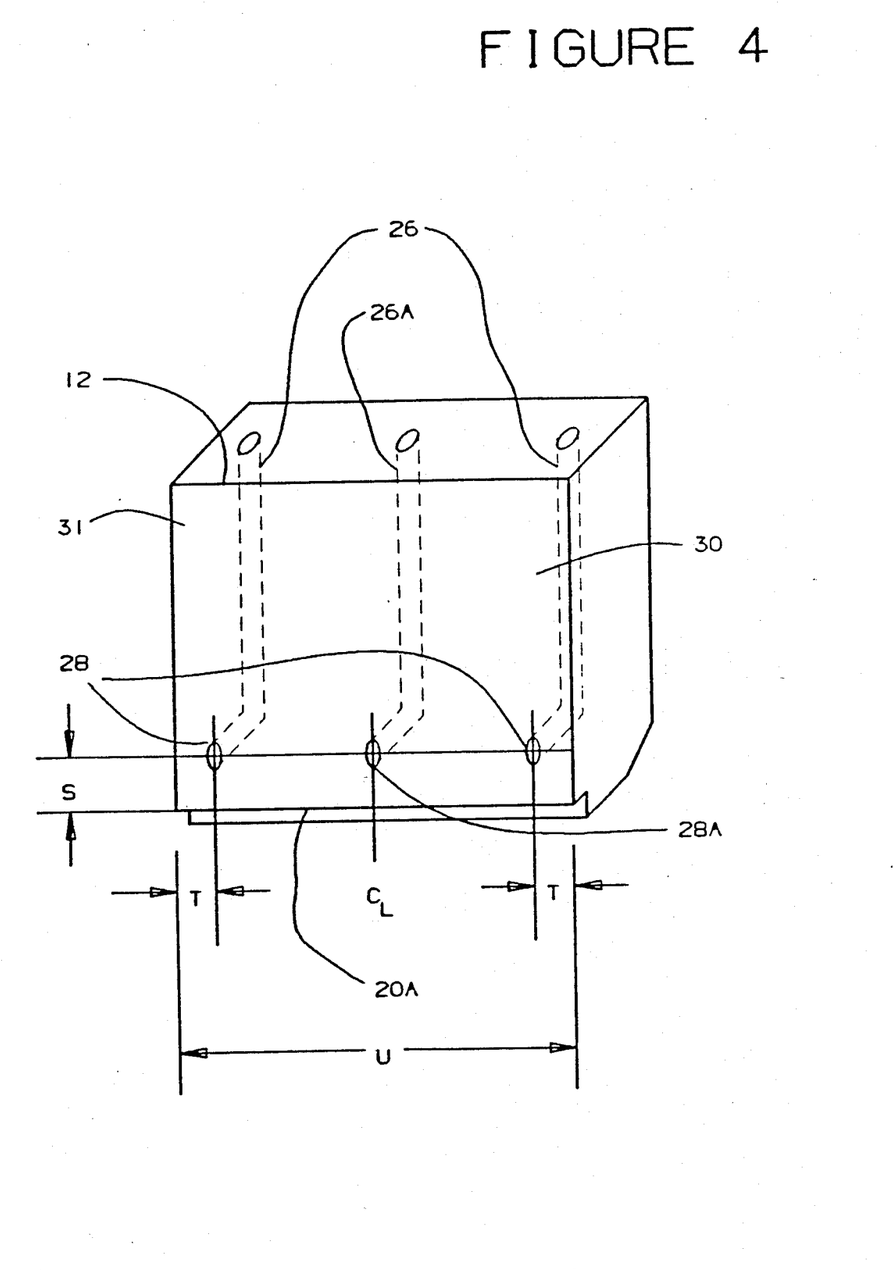
FIG. 4 is a perspective view of the upper-block of the nozzle of FIG. 1.

In FIG. 4 is shown a bottom view, in perspective, of the upper preheat block 12 of the scarfing unit shown in FIGS. 1, 2 and 3 and the location therein of outlet ports 28 and 28A. The width of upper preheat block 12 is shown generally as "U", with the outlet ports 28 and 28A being aligned transverse to the direction of flow of the oxygen stream through the nozzle slot 15. Outlet ports 28 are located a distance "S" from the front edge 20A of block 12, and are spaced a distance "T" from the side edges of the block 12. Outlet port 28A is located between said ports 28, generally along the center line of the block 12 and a distance "S" from the front edge 20A. In accordance with the invention, however, the location of outlet ports 28 and 28A in the lower surface 11 of block 20 can be varied, that is, the distance "S" for each of the ports 28 and 28A can be different or the same; the distance "T" for each of the ports 28 can be the same or different; and port 28A can be generally located intermediate ports 28.

Figure 5A:
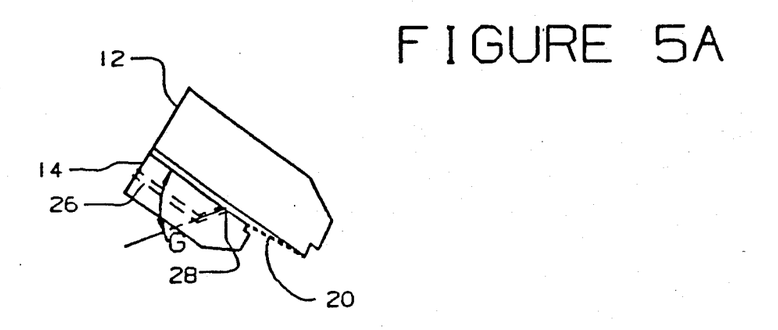
FIGS. 5A, 5B and 5C are side elevation views of alternate embodiments of a scarfing nozzle according to the invention.
Figure 5B:
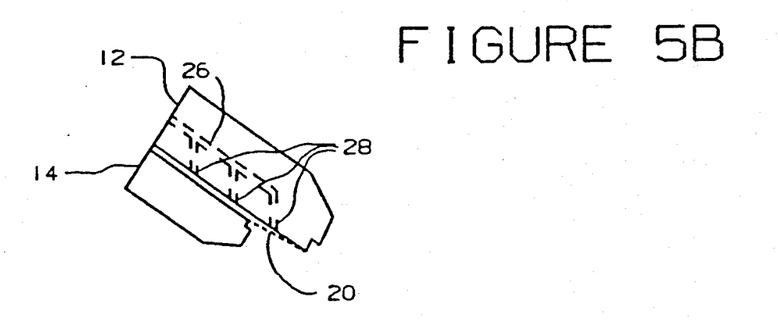
Figure 5C:
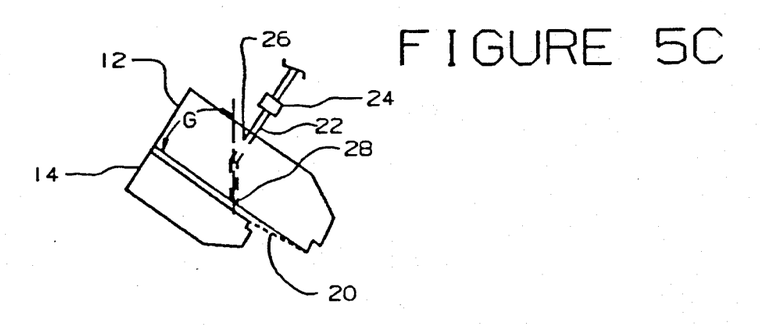

While the drawings show the gas supply pipes 22 and 22A connected at three points to the passages 26 and 26A for supplying diluting gas to the upper preheat block 12, other arrangements for providing gas to be admixed with the oxygen within the confines of the scarfing nozzle slot 15 before discharge from the discharge orifice 20 would also be suitable. For example, only two supply pipes 22 could be used; or as shown in FIG. 5A, passages 26 and 26A can be located through lower preheat block 14; or as shown in FIG. 5B, passages 26 and 26A can be located through upper preheat block 12 and then to a plurality of generally aligned outlet ports 28 and 28A; or as shown in FIG. 5C, supply pipes 22 and 22A can be directly connected to passages 26 and 26A in upper preheat block 12. More generally, the arrangement for the diluting gas should be located so that a selected or variable amount of said gas will be admixed with oxygen at the edges of a sheet-like oxygen stream within the confines of the scarfing nozzle slot 15 at varying locations in said nozzle slot 15 depending on the width of a "fin" free scarfing cut that is desired. As also shown in FIGS. 1, 3 and 5A to 5C, the angle of injecting a diluting gas into a sheet-like stream of oxygen within the confines of the nozzle slot 15 is designated as "G" (FIG. 3). The angle "G" shown is 60° (FIG. 3), although it can be varied in a range from about 5° to about 170°. An angle "G" in a range from about 30° to about 80° is generally preferred.

The nozzle passage 15 has a slot-like configuration with a constant cross-section so as to discharge a sheet-like stream of oxygen of uniform intensity across the surface of the workpiece corresponding to the width "U" (FIG. 4) of the nozzle 15. In accordance with the invention, the stream of oxygen discharged at the opposite side edges of the nozzle orifice 20 has a gas admixed therewith in an amount likely to reduce the purity of the oxygen therein which is insufficient to sustain a scarfing reaction beyond the boundaries of the scarfing cut. The boundary of the scarfing cut generally corresponds to the width of the orifice 20, or to a width less than the width of the orifice 20. The intensity or velocity of an oxygen admixture discharged at the side edges of the nozzle orifice 20 is, advantageously, substantially the same as the velocity of the sheet-like stream of pure or cutting oxygen discharged from the nozzle orifice 20, although some increase in intensity at the edges of the stream may result. In any event the velocity of the oxygen admixture makes a significant contribution to achieving "fin" free results by supplying momentum to carry away slag material and unoxidized steel.

Figure 6:
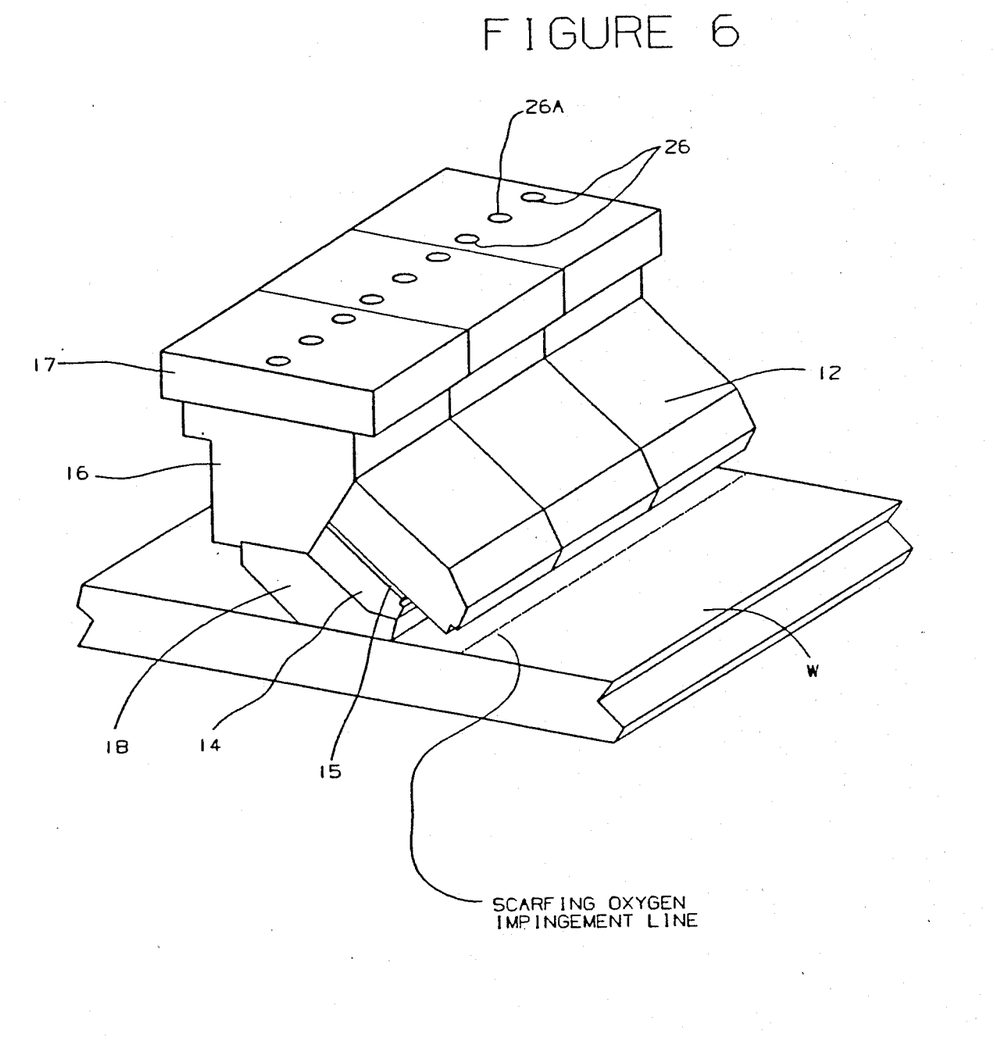
FIG. 6 is a perspective view of a bank of three scarfing units provided with nozzles according to the present invention in gang arrangement.

In FIG. 6 is illustrated the manner in which these scarfing units 10 are butted side-by-side in gang arrangement. There are no flow restrictions between the side edges of a scarfing unit so that the intensity of oxygen gas discharged across the width of the multiple nozzle discharge orifice 20 of the bank of scarfing units is substantially the same. A scarfing cut substantially of full depth removal as wide as the multiple nozzle arrangement would be created when no diluting gas is admixed with oxygen passing through the scarfing unit, increasing the width of the metal surface which may be scarfed in a single pass, including desurfacing of the entire workpiece. However, to insure maximum flexibility during spot scarfing with a gang arrangement, i.e. to be able to selectively spot scarf defects of varying width over the entire surface of the workpiece in a single pass, diluting gas feed means in accordance with the invention should be provided for use with each of the individual nozzles. Thus, the nozzles can be used as individual scarfing nozzles, or in gang arrangement, depending upon the width of the defect to be scarfed. In accordance with the invention, two or more, and generally up to about eleven scarfing units can be joined in butting gang relationship, depending on the maximum width of the workpiece and the nominal width of the individual scarfing unit.

FIGS. 1 to 3 illustrate the manner in which the scarfing unit 10 operates to produce a "fin" free scarfing cut substantially as wide as the nozzle or, alternatively, to produce selective spot scarfing cuts. As the scarfing unit comes in contact with the workpiece W and reaches the front end of an area containing defects to be removed, the unit is started, preferably by a flying start method such as disclosed in U.S. Pat. Nos. 3,991,985 and 3,966,503, and the flow of oxygen through the nozzle orifice 20 is adjusted to scarfing intensity. The flow of dilution gas through the upper preheat block 12 is adjusted to an amount sufficient to reduce the purity of the oxygen in at least one edge of the sheet-like stream thereof to achieve a "fin" free scarfing cut.

A dilution gas or fluid suitable to be admixed with the oxygen and thereby reduce the purity of the oxygen discharged from the orifice in accordance with the invention can be any fluid or gas other than oxygen which does not chemically oxidize iron in the normal scarfing reaction, such as air, nitrogen, water, fuel gas or mixtures thereof. The diluting gas or fluid can be physically admixed with an established oxygen stream in the nozzle slot 15 by injecting it into at least one of the edges of the stream of oxygen, preferably at one or more points along the opposing edges of said stream of oxygen.

It would be evident to those skilled in the art that the diluting gas can be introduced into oxygen by any other known physical method such as aspirations and the like. Moreover, it would be possible to admix the diluting gas into the oxygen stream within the nozzle or at any other section of the scarfing unit within the oxygen gas passage wherein the development of the sheet-like oxygen stream that is dispensed through the nozzle slot 15 may be formed.

At the beginning of the scarfing process, a molten puddle forms on the surface of the workpiece, the valve means (not shown) controlling oxygen flow through the nozzle orifice 20 are adjusted to scarfing intensity and the valve means (24) controlling the flow of diluting gas into the scarfing unit 10 are adjusted to obtain the required amount of dilution of oxygen at the edges of the stream thereof without inhibiting the intermediate width of pure oxygen for scarfing. As the scarfing unit 10 then passes over the workpiece, or the workpiece is advanced relative to the scarfing unit, a scarfing cut on the surface of the workpiece is thereby produced which is "fin" free along the boundaries of the scarfing pass. The scarfing unit 10 will remain on until it reaches the back end of the defective area, at which time it will be shut off.

While the stream of scarfing oxygen discharged from the nozzle discharge orifice 20 includes diluted oxygen of reduced purity along at least one edge thereof which will generally prevent a scarfing cut as wide as the nozzle width, an important feature of the present invention permits the amount of dilution to be controlled, for example, by increasing or decreasing the fluid pressure, so as to develop the best combination of conditions for "fin" control under extremes of scarfing condition variables and/or to size the scarfing cut width to a maximum or smaller width than that of the nozzle unit. Selection of the amount of dilution can be accomplished by automatic controls and, thus for example, sizing of a "fin" free scarfing pass can be done automatically. Moreover, as discussed hereinabove, the features of the nozzles of the present invention which contain no nozzle obstructions as well as having automatic control capabilities, can be seen to be particularly advantageous for use in gang arrangement applications.

Another advantageous feature of the present invention is operation of the scarfing unit to produce a scarfing cut which is "fin" free at one of the boundaries of the cut. Thus, a wider, full depth scarfing cut is produced because no dilution is imposed at the other boundary. Moreover, the scarfing unit can be used to make an overlapping pass or series of overlapping passes to effect thereby, desurfacing of the entire workpiece, more productively with fewer passes.

Typical of the scarfing condition variables are steel workpiece compositions, workpiece surface condition, scarfing speed, scarfing oxygen flow/pressure and steel temperature in addition to the inumerable combinations of variables that are involved in the fabrication of the scarfing apparatus itself. Thus, the range of oxygen purity that will sustain the scarfing reaction and/or the amount of dilution of the oxygen at the edges of the oxygen scarfing stream which will not sustain the scarfing reaction will vary somewhat. In general, oxygen purity of 99.5 percent or greater is desired for the scarfing reaction and dilution of the oxygen purity to a range between about 85 percent and 98 percent, or even lower, at the edges of the scarfing oxygen stream would be suitable in accordance with the invention.

The surprising and unexpected advantages achieved in accordance with the invention is indicated by the following example.

EXAMPLE

Referring to FIGS. 4 and 5C, a standard spot scarfing unit having a 210 mm wide slot nozzle (unit width U) is modified by drilling two holes (26), 6 mm in diameter, in the upper heater block 12. The holes are located 15 mm (T) from each of the block side edges, (FIG. 4), and 50 mm (S) from the front edge 20A of the upper block 12. Air is injected at a flow rate of 14 SCMH (standard cubic meters per hour at 0° C., 760 mm Hg) from each exit port (28) into a scarfing oxygen stream exiting at a rate of 1050 SCMH from orifice 20. The air (diluting fluid) is injected through the two ducts 26 at an angle G of 60° into the scarfing oxygen stream within the confines of the slot nozzle 15 of the scarfing unit 10.

The scarfing unit 10 is advanced at a scarfing speed of 9 meters/minute relative to a low carbon steel workpiece at a temperature of about 20° C.

Figure 7A:
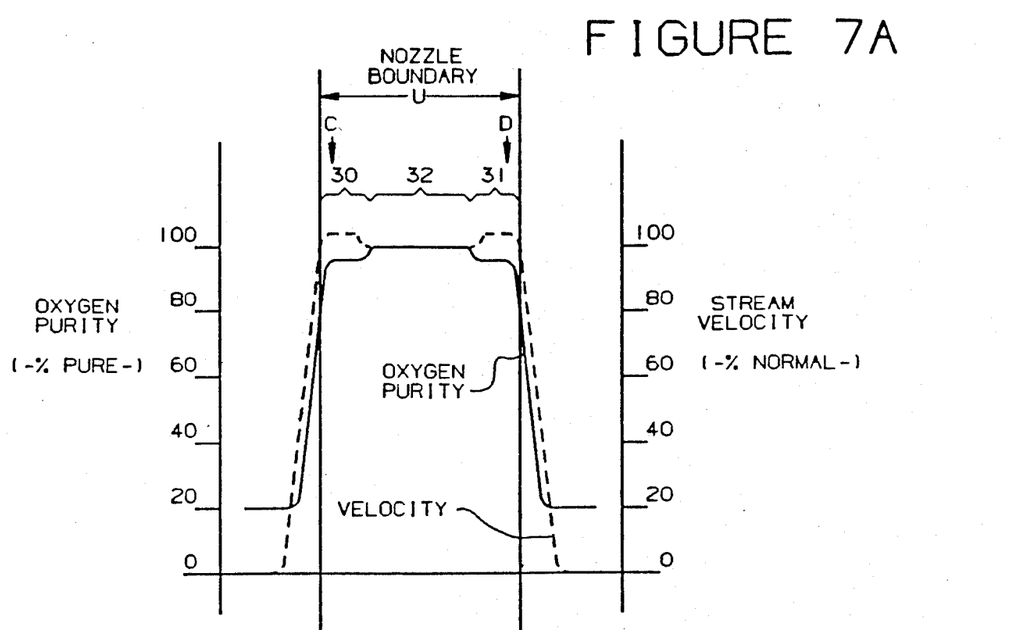
FIG. 7A graphically illustrates profiles of fluid velocity and oxygen purity of the example.
Figure 7B:
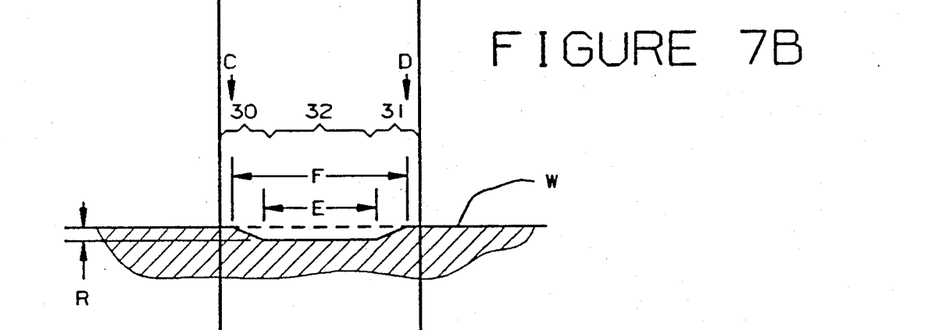
FIG. 7B illustrates a typical cross-section of metal removal from the surface of a metal workpiece in the example.

Results of the various test runs are graphically illustrated in FIG. 7A combined with the cross-section of metal removal shown in FIG. 7B.

In FIGS. 7A and 7B are indicated the general parameters in accordance with the invention with the areas marked "30" and "31" generally indicating where the scarfing reaction is gradually being reduced and terminating, "fin" free, at the boundary of the scarfing cut; and the area marked "32" generally indicated where the scarfing reaction is proceeding to obtain full depth removal of metal. At some percentage of oxygen purity, assuming all other variables are constant, the scarfing reaction cannot be sustained. The scarfing cut is terminated, "fin" free, at points C and D, however, the velocity of the slot oxygen stream as it exits the nozzle remains substantially the same, outward past points C and D. A typical cross-section of metal removal from the surface of the steel workpiece is shown, with E being the width of the normal full depth removal R of the scarfing pass and F being the total width of scarfing pass. The normal full depth removal width, E, generally corresponding to the area 32, is 150 mm; a total width of scarfing pass, F, which occurs between points C and D is 200 mm; and the metal removal, R, is 4 mm. Thus, within areas 30 and 31 are areas where the scarfing reaction is gradually being reduced and at points C and D, scarfing is terminated. At areas beyond these points, C and D, no scarfing occurs. However, beyond points C and D, the fluid velocity remains approximately the same as area 32 for some distance, and then tapers to zero. This velocity condition contributes to "fin" free results by blowing away the slag material and unoxidized steel.

What is claimed is:

1. An oxygen discharge nozzle unit for scarfing defects in a metal body characterized by a construction which can be selectively operated to avoid the formation of "fins" along the side edge portions of the scarfing cut, selectively operated to produce scarfing cuts of widths less than the width of the nozzle up to substantially the entire width of the nozzle, and can be operated in side-by-side relationship with other nozzle units to produce scarfing cuts up to substantially the full width of the combined side-by-side nozzle units; said nozzle unit comprising manifold and head means for receiving therein and distributing therefrom scarfing oxygen and non-scarfing gas;

spaced-apart upper and lower preheat block means connected at one end to and extending from said manifold and head means and defining therebetween a generally uniform slot-like nozzle passageway of a predetermined width and a discharge orifice at the other end for receiving scarfing oxygen from said manifold and head means within said nozzle passageway and discharging a sheet-like stream of scarfing oxygen from said discharge orifice of at least generally the same width as said nozzle passageway;

non-scarfing gas passageway means extending from said manifold and head means through at least one of said upper and lower preheat block means and positioned for selectively receiving non-scarfing gas from said manifold and head means and selectively injecting non-scarfing gas into said nozzle passageway between the ends of said upper and lower preheat blocks and along the sides of said nozzle passageway for selectively admixing the scarfing gas and non-scarfing gas at the side edge portions of the sheet-like stream of scarfing gas being discharged from said discharge orifice prior to discharge therefrom so that the side edge portions of the sheet-like stream of gas being discharged is of a reduced oxygen purity insufficient to scarf the metal body to avoid the formation of fins along the side edge portions of the scarfing cut and to control the width of the scarfing cut; and means operatively associated with said non-scarfing gas passageways for selectively controlling the flow or non-flow of non-scarfing gas to one or both sides of said nozzle passageway depending upon the width of the scarfing cut desired and whether said nozzle unit is to be used with other nozzle units.

2. An oxygen discharge nozzle unit, as set forth in claim 1, in which said nozzle passageway formed between said upper and lower preheat blocks further comprises open side portions to aid in operation of said nozzle unit in side-by-side relationship with other nozzle units to produce scarfing cuts without interruptions therein up to substantially the full width of the combined side-by-side nozzle units.

3. An oxygen discharge nozzle unit, as set forth in claim 1 or 2, in which said means for controlling the flow of non-scarfing gas provides for injecting the non-scarfing gas into said nozzle passageway of a flow rate less than the flow rate of the scarfing oxygen in said nozzle passageway.

4. Preheat block means adapted to be attached to and form a part of an oxygen discharge nozzle unit for scarfing defects in a metal body and having a manifold and head means for receiving therein and distributing therefrom scarfing oxygen and non-scarfing gas and means for selectively controlling the flow or non-flow on non-scarfing gas; said preheat block means comprising:

upper and lower preheat blocks adapted to be connected at one end to and extend from the manifold and head means of the nozzle unit in spaced-apart relationship for defining therebetween a generally uniform slot-like nozzle passageway of a predetermined width and a discharge orifice at the other end for receiving scarfing oxygen from the manifold and head means of the nozzle unit within said nozzle passageway and discharging a sheet-like stream of scarfing oxygen from said discharge orifice of at least generally the same width as said nozzle passageway; and non-scarfing gas passageway means extending through at least one of said upper and lower preheat blocks and positioned for selectively receiving non-scarfing gas from the manifold and head means of the nozzle unit and selectively injecting non-scarfing gas into said nozzle passageway between the ends of said upper and lower preheat blocks and along the sides of said nozzle passageway for selectively admixing the scarfing gas and non-scarfing gas at the side edge portions of the sheet-like stream of scarfing gas being discharged from said discharge orifice prior to discharge therefrom so that the side edge portions of the sheet-like stream of gas being discharged is of a reduced oxygen purity insufficient to scarf the metal body to avoid the formation of fins along the side edge portions of the scarfing cut and to control the width of the scarfing cut.

* * * * *

UNITED STATES PATENT AND TRADEMARK OFFICE
CERTIFICATE OF CORRECTION

PATENT NO. : 4,765,597

DATED : 8-23-88

INVENTOR(S) : Fuhrhop et al.

It is certified that error appears in the above-identified patent and that said Letters Patent is hereby corrected as shown below:

ON THE TITLE PAGE:
Please add the following in References Cited:

U.S. PATENT DOCUMENTS

| | | | |
|---|---|---|---|
| 3,966,503 | 6/76 | Engel | 148/9.5 |
| 3,991,985 | 11/76 | Engel | 148/9.5 |

FOREIGN PATENT DOCUMENTS

| | | |
|---|---|---|
| 106,342 | 9/77 | Japan |
| 10,255 | 1/79 | Japan |
| 1,481 | 1/80 | Japan |
| 112,168 | 8/80 | Japan |
| 13,543 | 3/81 | Japan |

Signed and Sealed this

Fourteenth Day of February, 1989

Attest:

DONALD J. QUIGG

Attesting Officer

Commissioner of Patents and Trademarks